(12) United States Patent
Beyer et al.

(10) Patent No.: US 6,197,386 B1
(45) Date of Patent: Mar. 6, 2001

(54) METHOD FOR APPLYING A COATING BY MEANS OF PLASMA SPRAYING WHILE SIMULTANEOUSLY APPLYING A CONTINUOUS LASER BEAM

(75) Inventors: Eckhard Beyer, Rott/Roetgen; Steffen Nowotny, Radebeul, both of (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/151,607

(22) Filed: Sep. 11, 1998

(30) Foreign Application Priority Data

Sep. 12, 1997 (DE) ............................................. 197 40 205

(51) Int. Cl.⁷ ....................................................... C23C 4/12
(52) U.S. Cl. ......................... 427/450; 427/453; 427/454; 427/455; 427/456; 427/554; 427/570; 427/576
(58) Field of Search .................................. 427/450, 453, 427/455, 456, 554, 570, 576, 454

(56) References Cited

U.S. PATENT DOCUMENTS 3,310,423  3/1967  Ingham, Jr. .

5,688,564  11/1997  Coddet et al. .
5,759,641  * 6/1998  Dimitrienko et al. ............... 427/556

FOREIGN PATENT DOCUMENTS

| 2 715 942 | 8/1995 | (FR) . |
|---|---|---|
| 61-91323 | * 5/1986 | (JP) . |
| 63-69959 | * 3/1988 | (JP) . |
| 63-69 959 | 3/1988 | (JP) . |
| 4-214 849 | 8/1990 | (JP) . |
| 6-272012 | * 9/1994 | (JP) . |

* cited by examiner

*Primary Examiner*—Katherine A. Bareford
(74) *Attorney, Agent, or Firm*—Barnes & Thornburg

(57) ABSTRACT

The invention relates to a method for applying a coating by means of plasma spraying to a substrate, in which method the beam of a laser is additionally used, it being possible to coat a very wide variety of substrates in order, in particular, to improve the properties on the substrate surface. Moreover, the method according to the invention is to achieve a high coating rate and, in addition to advantageous adhesion and density of the layer, also to influence in a controlled manner the layer structure which is being formed. The procedure is that at least one continuous laser beam is directed through the spray jet, with a predeterminable interaction time, directly onto the surface of the substrate or the surface of a layer which has already been applied thereto, so as to initiate the melting thereof

25 Claims, 1 Drawing Sheet

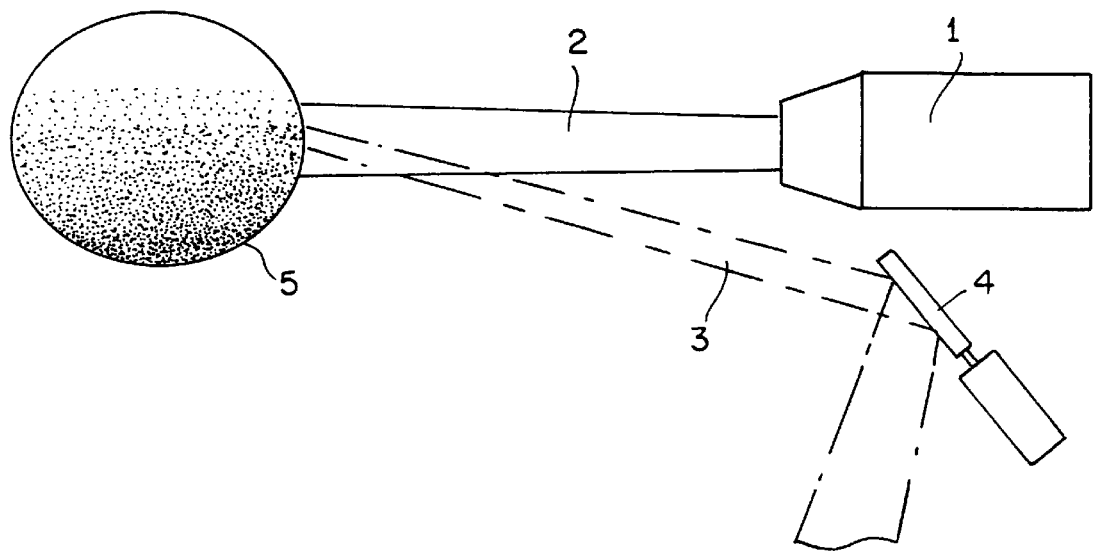

METHOD FOR APPLYING A COATING BY MEANS OF PLASMA SPRAYING WHILE SIMULTANEOUSLY APPLYING A CONTINUOUS LASER BEAM

BACKGROUND OF THE INVENTION

The invention relates to a method for applying a coating to a substrate by means of plasma spraying with the use of a laser beam, which is suitable for coating a very wide variety of substrates, in particular for improving the properties, such as for example hardness, wear resistance and corrosion resistance, and which can be achieved with high coating capacities.

U.S. Pat. No. 3,310,423 has disclosed a flame-spraying method in which a pulsed laser beam is to be used for assistance in order to improve or increase the adhesion of the coating and its density.

In that document, it is proposed to direct the beam of a laser, which is in temporally short pulses, into a spray jet, specifically in such a way that the particles are reheated before they strike the surface to be coated. The document furthermore proposes to increase the particle temperature to such an extent that the surface is softened by heat transfer from the particles and forms an alloy with the particle material. In the case of a multi-layer build-up, the intention is for the surface of the top layer to be partially melted and fused to the particles sprayed on.

However, with the performance parameters indicated, only a limited amount of energy can be made available to increase the temperature in pulsed operation of the laser, so that only relatively low coating rates can be achieved or the desired level of success cannot be achieved.

Moreover, it is impossible to influence other properties of the coating applied which are again desirable in different respects for a very wide variety of coating materials. For example, it is possible that during cooling phases, microstructural or crystalline structures which do not have the desired properties, or have them only to an insufficient extent, will be formed. When applying a coating which contains at least $Al_2O_3$, the γ phase may be formed, the properties of which are far removed from those of the preferred α phase. Similar effects also occur for metals or such alloys. Owing to its high melting point, $Al_2O_3$, for example, cannot be processed at all to give usable layers by flame spraying, even with the laser assistance proposed in that document.

SUMMARY OF THE INVENTION

Therefore, on the basis of the above, the object of the invention is to provide a method with which it is possible to apply coatings to a very wide variety of substrates at a high coating rate while providing the possibility of influencing in a controlled manner the layer structure which is being formed, in addition to achieving suitable adhesion and density of the layer.

According to the invention, this object is achieved by means of coating a substrate by means of plasma spraying, in which method a continuous laser beam is additionally used and is directed through a plasma spray jet and at least one of the laser power and the beam shaping is set in such a way that the temperature of the layer being applied is kept above temperatures found in a cooling curve. Advantageous configurations and refinements of the invention make it possible to achieve the features mentioned in the subordinate claims.

In the novel and inventive method, the coating material is sprayed onto the surface of the substrate to be coated in a known manner using a plasma torch. The plasma arc does not come into any contact with the workpiece surface and the calorific content of the spray jet is insufficient to initiate melting of the substrate surface so as to achieve a fusion bond and/or diffusion bond between coating and substrate. However, this is achieved in that a laser beam, which is preferably out of focus, is directed at least partially through the spray jet onto the surface of the substrate or the surface of a layer which has already been applied thereto, with a predeterminable interaction time. The energy of the laser beam is to be sufficiently great to initiate melting of the surface, it being preferable for the melting to reach a depth of approx. 0.1 mm. Moreover, it is desirable to influence the temperatures in such a way that the particles of coating material which are sprayed on become fused together, it being possible, if necessary, to add a suitable flux (e.g. boron or silicon) to the coating material.

The laser beam to be used should have a power which lies in the range from 2 to 15%, particularly advantageously in the range between 5 and 10%, of the power of the plasma arc.

In the method according to the invention, although the laser beam does penetrate through the spray jet, it only produces its full action on reaching the surface of the substrate to be coated or a layer which has already been applied thereto, so that melting of the surface in question is initiated and the spray particles which have already struck the said surface are held at the melting temperature in order to allow them to be fused together. In this process, the required heating provided by the laser beam takes place in a suitably locally limited region. If coating materials which at least contain metals are used, it is possible to obtain a metallurgical bond of high density, high adhesive strength and homogeneity.

Advantageously, the out-of-focus laser beam is directed at an angle of between 0 and 90° onto the surface, thus forming a focal spot which deviates from the circular focal spot. The angle between surface and laser beam should preferably lie between 10 and 80°. The angle between laser beam and spray jet should be between 0 and 90° and preferably between 0 and 45°.

Since the focal spot on the substrate surface does not cover the entire area of the plasma jet, despite being out-of-focus, the laser beam can be deflected using suitable means, such as for example mirrors, and this should, of course, additionally take into account the relative movement between spray jet and substrate. To do this, it is possible to use oscillating mirror systems or faceted mirrors, by means of which not only the focal spot geometry but also the intensity distribution can be influenced. However, the laser beam should be guided at least to some extent directly in the region of the layer which is being formed, although it can also be used for preheating and for maintaining the temperature.

Expediently, the beam should be shaped by one-dimensional or two-dimensional beam oscillation using oscillating plane mirrors. In the most simple case, this can take place without coupling to the laser-power control. As a result, it is possible to achieve a variably adjustable laser focal spot which assumes the form of a rectangle, for example. Taking into account the required beam intensities of several $10^3$ W/cm$^2$ in this way it is possible to cover at least the entire coating track applied using the spray jet.

Irrespective of the way in which the beam is shaped, it may be advantageous, by means of a suitable combination of laser, plasma and spray parameters, to thermally affect the layer which is forming, solidifying and cooling in such a way that certain desired microstructural states and phases can be formed. This is achieved in that it is possible, in contrast to the unaffected, abrupt solidification and cooling curve, to have a controlled influence, depending on the combination of materials and desired layer properties, on a temperature rise, by maintaining a specific temperature in the layer or on the spatial and temporal temperature gradients during the cooling operation by means of the action of the laser beam.

Given a plasma torch power of 20 kW, it is possible, by way of example, to use a laser with a power of 1.5 kW, the focal spot of which is defocused to 5 to 10 mm and directed onto the surface. Lasers which have proven suitable are Nd-YAG lasers with a wavelength of 1.06 $\mu$m or diode lasers in this power range with wavelengths of 0.94 $\mu$m. However, it is also possible to employ other lasers, it being possible to take into account the absorption behavior of the surfaces in order to keep the efficiency as high as possible. If the laser beam parameters are configured suitably, the spray jet can be used to achieve a focal length of approx. 20 mm if the laser beam is manipulated as described above.

The method according to the invention can be refined by controlling the laser power during the two-dimensional deflection of the laser beam in a location-resolved manner, so that a desired temperature distribution on the surface of the substrate and in the layer applied can be maintained, it being possible to take into account the different speeds at which the laser beam is guided and the different roles (heating up and maintaining a desired temperature).

Advantageously, the laser beam should be guided in such a way that it follows the form of a rectangle, which has a beneficial effect on the resultant temperature regime and on adapting it to the location where the spray particles strike the surface.

Furthermore, it is intended to adjust not only the laser power, the laser-beam intensity and the deflection speed of the laser beam taking into account the materials for the coating and the substrate (in particular their melting temperature and thermal conductivity), but also the plasma parameters, the working and feed rate, the track distance and the spray distance and/or to adapt a plurality of these parameters to one another.

The method can be carried out under normal atmosphere conditions, but it may also be advantageous to surround the location where the layer is formed with an inert or reactive gas. For certain coatings, it is possible for this purpose to use, for example, nitrogen, which may react with the coating material and acts as a reactive gas.

For certain cases, it may be advantageous to use two lasers which irradiate different areas on the substrate surface, so that the temperatures at the various locations along the track can be affected even more suitably. The lasers may have different outputs or wavelengths.

However, in a similar manner, it is also possible to use a beam splitter which divides the laser beam of one laser into two beams which are then guided parallel to one another and at a distance apart or completely independently of one another. The two part beams may also have different power components or may be directed onto the surface of the substrate with different beam intensities.

Various metals, metal alloys, hard carbide materials, ceramic or mixtures thereof may be used as the coating materials, which are preferably pulverulent.

Thus it is possible, by way of example, to apply an $Al_2O_3$ coating which as a result of the possibility of influencing the temperature which is now provided predominantly has the desired $\alpha$ phase.

However, it is also possible to use other materials with a relatively high melting point for the coating.

The method can be conducted in such a way that the coating is applied as a multi-layer build-up by successively applying a plurality of relatively thin individual layers (thickness approx. 0.01 to 0.3 mm), and it is also possible to build up alternate layers of different materials.

BRIEF DESCRIPTION OF THE DRAWINGS

The invention is to be described in more detail below with reference to an example.

The single FIG. 1 shows the basic layout with which the method can be carried out.

DETAILED DESCRIPTIONS OF ILLUSTRATIVE EMBODIMENTS

According to this example, it is intended to apply a wear-resistant and temperature-stable coating with a layer thickness of 1 mm to a rotationally symmetrical component made from a heat-treated steel with an external diameter of 120 mm.

The coating material used is a CoCrWc alloy in powder form which is commercially available. The cobalt-based powder contains 28 wt % Cr, 4 wt % W and 1.7 wt % C.

A plasma torch 1 with a power of 20 kW is used for spraying onto the component 5 (substrate).

In addition, a 1.5 kW diode laser with a wavelength of 0.94 $\mu$m is used, the laser beam 3 is focused using a lens with a focal length of 400 mm and, in conjunction with an oscillating plane mirror 4, is arranged in such a way that the laser beam 3 is directed onto the component surface at an angle of approx. 30° to the plasma jet 2. The laser beam 3 penetrates through the plasma jet 2 over a short distance and strikes the component surface directly and out-of-focus in the region of the layer which is being formed. By means of the oscillating mirror 4, the focal spot of the laser beam 3 is shaped into a rectangle which in this example has the dimensions of 2×10 mm². The oscillation frequency of the mirror is 300 Hz.

The coating is applied in a plurality of individual layers, layer thicknesses of between 0.05 and 0.08 mm being achieved. The result, based on the surface area of the laser focal spot, is a relatively small volume of coating material which has already been heated to the melting temperature or beyond (1500–2000° C.), which the laser beam 3 is readily able to hold at the melting temperature for sufficiently long for the sprayed-on particles to be able to fuse together onto the component surface or the corresponding layer.

The fact that the plasma torch 1 provides most of the process heat and the additional material is completely melted as early as in the plasma torch 1 means that high coating rates can be achieved even at the comparatively low laser powers of 1 to 2 kW. Thus the circumferential speeds which can be achieved on the component 5 lie in the region of 4 to 8 m/min. If the feed is set to 8 mm/revolution, the result is an overlap level of the laser-beam paths of 20%, which advantageously produces a continuously laser-influenced microstructure.

The coating applied had a significantly improved adhesion by comparison with layers applied solely by plasma spraying, owing to the metallurgical bond which was formed over wide areas and was set up by partially melting the materials of component and coating.

The coating had a density of between 90 and 98% of the theoretical density.

What is claimed is:

1. Method for applying a coating material to a substrate by means of plasma spraying, in which method the beam of a laser is additionally used, characterized in that a continuous laser beam (3) is directed through a plasma spray jet (2), with a predetermined interaction time, directly onto the surface of the substrate (5) and the surface of a layer which has already been applied thereto, so as to initiate melting of the surface of the substrate (5) and the surface of the layer, the method further characterized in that at least one of the laser power and the beam shaping is set in such a way that the temperature of the layer being applied is kept above temperatures found in the cooling curve of the layer in order to influence the phases and microstructure states which are formed in the surface of the substrate (5) and the surface of the layer which has already been applied thereto in a controlled manner, and the coating material is melted before being applied to one of the surface of the substrate (5) and the surface of the layer which has already been applied thereto.

2. Method according to claim 1, characterized in that a laser with a power which lies between 2 and 15% of the power of the plasma torch (2) is used.

3. Method according to claim 1 characterized in that the laser beam (3) is directed out-of-focus onto the surface of the substrate (5).

4. Method according to claim 1 characterized in that the laser beam (3) is directed at at least one of an angle of between 0 and 90° with respect to the surface of the substrate (5) and an angle lying between 0 and 90° with respect to the spray jet.

5. Method according to claim 1 characterized in that the laser beam (3) is moved along the surface of the substrate (5) as a function of the relative movement of the plasma jet (2).

6. Method according to claim 1 characterized in that the coating is applied to the substrate (5) as a multi-layer build-up of a plurality of superposed individual layers having a thickness of about 0.01 to 0.3 mm.

7. Method according to claim 1 characterized in that the laser beam (3) is influenced, with regard to at least one of the focal spot geometry and the intensity distribution in the focal spot, by means of one of an oscillating mirror system (4) ad a faceted mirror.

8. Method according to claim 1 characterized in that the laser power, under a two-dimensional oscillation of the laser beam (3), is controlled as a function of location along the surface of the substrate (5) which is coated with the plasma spray jet (2) and thus a specific three-dimensional intensity profile is produced in the focal spot of the laser beam.

9. Method according to claim 1 characterized in that the laser beam (3), forming a rectangular focal spot, is guided over that region of the surface of the substrate (5) which is to be coated at least to some extent directly in the region of the layer which is being formed.

10. Method according to claim 1 characterized in that at least one of the laser power, the laser-beam intensity, plasma torch power the working rate, the feed rate, the trace distance and the spray distance is set as a function of the substrate and coating material.

11. Method according to claim 1 characterized in that one of a Nd-YAG laser and a diode laser is used.

12. Method according to claim 1 characterized in that a second laser is used and the said laser and the said second laser are oriented to irradiate first and second areas, respectively, on the substrate surface.

13. Method according to claim 12 characterized in that the beams provided by said laser and said second laser have at least one of different powers, different focal spot geometries and different intensity distributions.

14. Method according to claim 1 characterized in that the laser beam is divided into two beams which are directed onto the surface of the substrate (5).

15. Method according to claim 1 characterized in that at least one of metals, metal alloys, carbides, ceramic and mixtures thereof is used as the coating material.

16. Method according to claim 15, characterized in that pulverulent coating material is used.

17. Method according to claim 16 characterized in that at least one of a protective gas and a process gas which affects the formation of phases in the layer is used in addition to the carrier gas for the pulverulent coating material.

18. Method according to claim 17, characterized in that at least one of nitrogen, argon, helium, hydrogen, oxygen, methane and mixtures thereof is used as at least one of the protective gas and the process gas.

19. Method according to claim 1 characterized in that at a plurality of the laser power, the laser-beam intensity, plasma torch power, the working rate, the feed rate, the trace distance and the spray distance are adapted to one another.

20. The method according to claim 1 wherein the laser beam is focused to influence the cooling rate of the plasma sprayed coating material.

21. The method according to claim 1 wherein the laser beam is moved to influence the cooling rate of the plasma sprayed coating material.

22. The method according to claim 1 wherein the laser beam is focused to influence the cooling rate of the plasma sprayed coating material with respect to the forming of the laser-influenced phases.

23. The method according to claim 1 wherein the laser beam is moved to influence the cooling rate of the plasma sprayed coating material with respect to the forming of the laser-influenced phases.

24. The method according to claim 1 wherein the laser beam is focused to influence the cooling rate of the plasma sprayed coating material with respect to the forming of the microstructure states.

25. The method according to claim 1 wherein the laser beam is moved to influence the cooling rate of the plasma sprayed coating material with respect to the forming of the microstructure states.

* * * * *